(12) United States Patent
Mitsunaga et al.

(10) Patent No.: US 9,826,158 B2
(45) Date of Patent: Nov. 21, 2017

(54) TRANSLATION DISPLAY DEVICE, TRANSLATION DISPLAY METHOD, AND CONTROL PROGRAM

(71) Applicant: Sharp Kabushiki Kaisha, Osaka-shi, Osaka (JP)

(72) Inventors: Takaaki Mitsunaga, Osaka (JP); Tatsuo Kishimoto, Osaka (JP); Kiyofumi Ohtsuka, Osaka (JP); Hirokazu Ishikawa, Osaka (JP)

(73) Assignee: Sharp Kabushiki Kaisha, Sakai (JP)

(*) Notice: Subject to any disclaimer, the term of this patent is extended or adjusted under 35 U.S.C. 154(b) by 0 days.

(21) Appl. No.: 15/038,492

(22) PCT Filed: Aug. 8, 2014

(86) PCT No.: PCT/JP2014/071067
§ 371 (c)(1),
(2) Date: May 23, 2016

(87) PCT Pub. No.: WO2015/079745
PCT Pub. Date: Jun. 4, 2015

(65) Prior Publication Data
US 2016/0301869 A1    Oct. 13, 2016

(30) Foreign Application Priority Data
Nov. 27, 2013  (JP) .................................. 2013-245455

(51) Int. Cl.
*H04N 5/228* (2006.01)
*H04N 5/232* (2006.01)
(Continued)

(52) U.S. Cl.
CPC .......... *H04N 5/23251* (2013.01); *G06F 3/14* (2013.01); *G06F 17/28* (2013.01);
(Continued)

(58) Field of Classification Search
None
See application file for complete search history.

(56) References Cited

U.S. PATENT DOCUMENTS

2007/0266312 A1   11/2007   Ayaki et al.
2012/0250943 A1   10/2012   Aomi

FOREIGN PATENT DOCUMENTS

| JP | 2007-306416 A | 11/2007 |
| JP | 2010-103694 A | 5/2010 |
| JP | 2011-134144 A | 7/2011 |

OTHER PUBLICATIONS

Official Communication issued in International Patent Application No. PCT/JP2014/071067, dated Nov. 4, 2014.

*Primary Examiner* — Stephen Coleman
(74) *Attorney, Agent, or Firm* — Keating & Bennett, LLP (57) ABSTRACT

A translation display device of the present invention carries out a translation process of translating text extracted from a certain image and displays translated text while a display frame rate is maintained. A translation processing section (5) carries out the translation process in a case where no image other than the certain image is being subjected to the translation process. An image movement analyzing section (7) identifies a displacement of a position of an object in a most recent image which has been most recently obtained, the displacement being measured with respect to a reference position of an object in a reference image for which the translation process most recently ended. A generated image in which translated text obtained by translating extracted text extracted from the reference image is displayed so as to be superimposed on the most recent image in accordance with (i) a position of the extracted text and (ii) information on the displacement.

3 Claims, 5 Drawing Sheets

(51) Int. Cl.
  *G06F 17/28* (2006.01)
  *G06F 3/14* (2006.01)
  *G06K 9/18* (2006.01)
  *G06K 9/46* (2006.01)
(52) U.S. Cl.
  CPC ........... *G06F 17/2809* (2013.01); *G06K 9/18* (2013.01); *G06K 9/4604* (2013.01); *H04N 5/23293* (2013.01)

TRANSLATION DISPLAY DEVICE, TRANSLATION DISPLAY METHOD, AND CONTROL PROGRAM

TECHNICAL FIELD

The present invention relates to (i) a translation display device for translating text in an image and displaying the text thus translated, (ii) a method of displaying a translation, and (iii) a control program.

BACKGROUND ART

In recent years, a technique related to a translation display device has been developed. Such a translation display device (i) extracts text from an image captured by a camera, (ii) identifies the text, (iii) translates the text into a predetermined language, and (iv) displays the text thus translated.

For example, Patent Literature 1 discloses an information display device for (i) carrying out real-time translation or conversion of foreign language text and/or a pictograph which has/have been extracted from an image by use of an optical character reader (OCR) and (ii) displaying translated or converted text and/or pictograph at a suitable display position. Patent Literature 2 discloses a technique for promptly displaying an image. According to the technique, (i) images corresponding to respective of a first frame and a second frame by which the first frame is immediately followed are analyzed, (ii) text which has been extracted and translated in the first frame is displayed in the second frame so that the text thus displayed follows a position of the text in the first frame, and (iii) only text in a newly captured region in the image of the second frame is extracted and translated.

CITATION LIST

Patent Literature

Patent Literature 1
Japanese Patent Application Publication Tokukai No. 2011-134144 (Publication date: Jul. 7, 2011)
Patent Literature 2
Japanese Patent Application Publication Tokukai No. 2010-103694 (Publication date: May 6, 2010)

SUMMARY OF INVENTION

Technical Problem

In connection with advancement in translation display devices, the number of extractable character types has increased and multilingual translation has become available. This has increased a length of time required for carrying out a text extracting process and a translation process, and therefore poses a problem for the conventional techniques disclosed in Patent Literatures 1 and 2. Specifically, according to the conventional techniques, a text in part of or an entire part of each image is extracted and translated. This unfortunately causes a reduction in display frame rate.

The present invention has been made in view of the problem, and an object of the present invention is to provide (i) a translation display device for translating text extracted from an image and displaying the text thus translated while a frame rate is maintained, (ii) a method of displaying translation, and (iii) a control program.

Solution to Problem

In order to attain the object, a translation display device in accordance with an aspect of the present invention is a translation display device including: an image obtaining section for sequentially obtaining images; a translating section for a carrying out a translation process of translating text extracted from any given image, the translating section subjecting a certain image to the translation process in a case where the image obtaining section obtains the certain image while no image other than the certain image is being subjected to the translation process; a movement information identifying section for identifying movement information indicative of a displacement of a position of an object in a most recent image which has been most recently obtained by the image obtaining section, the displacement being measured with respect to a reference position of an object in a reference image for which the translation process most recently ended; and a display section for displaying a generated image in which translated text obtained by translating extracted text extracted from the reference image is superimposed on the most recent image in accordance with (i) a position of the extracted text and (ii) the movement information.

A method of displaying translation in accordance with an aspect of the present invention is a method of displaying a translation, including the steps of: (a) sequentially obtaining images; (b) carrying out a translation process of translating text extracted from any given image, the step (b) being carried out so that a certain image is subjected to the translation process in a case where the certain image is obtained while no image other than the certain image is being subjected to the translation process; (c) identifying movement information indicative of a displacement of a position of an object in a most recent image which has been most recently obtained in the step (a), the displacement being measured with respect to a reference position of an object in a reference image for which the translation process most recently ended in the step (b); and (d) displaying a generated image in which translated text obtained by translating extracted text extracted from the reference image is superimposed on the most recent image in accordance with (i) a position of the extracted text and (ii) the movement information.

Advantageous Effects of Invention

An aspect of the present invention brings about an effect of displaying, without delaying a timing at which an image is to be displayed (i.e., without reducing a frame rate), an image in which a certain level or more of accuracy is maintained in term of (i) a translation of text and (ii) a position at which translated text is to be displayed.

DESCRIPTION OF EMBODIMENTS

Embodiment 1

Figure 1:
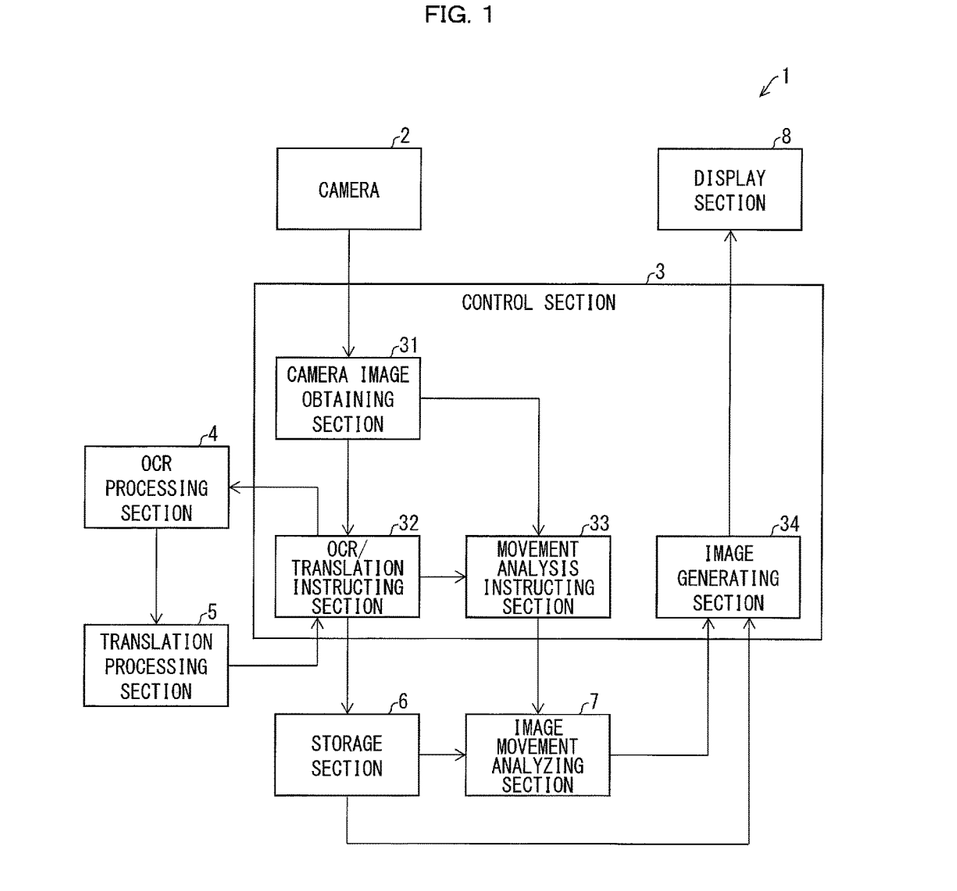
FIG. 1 is a block diagram illustrating main configurations of a translation display device in accordance with Embodiment 1 of the present invention.
Figure 2:
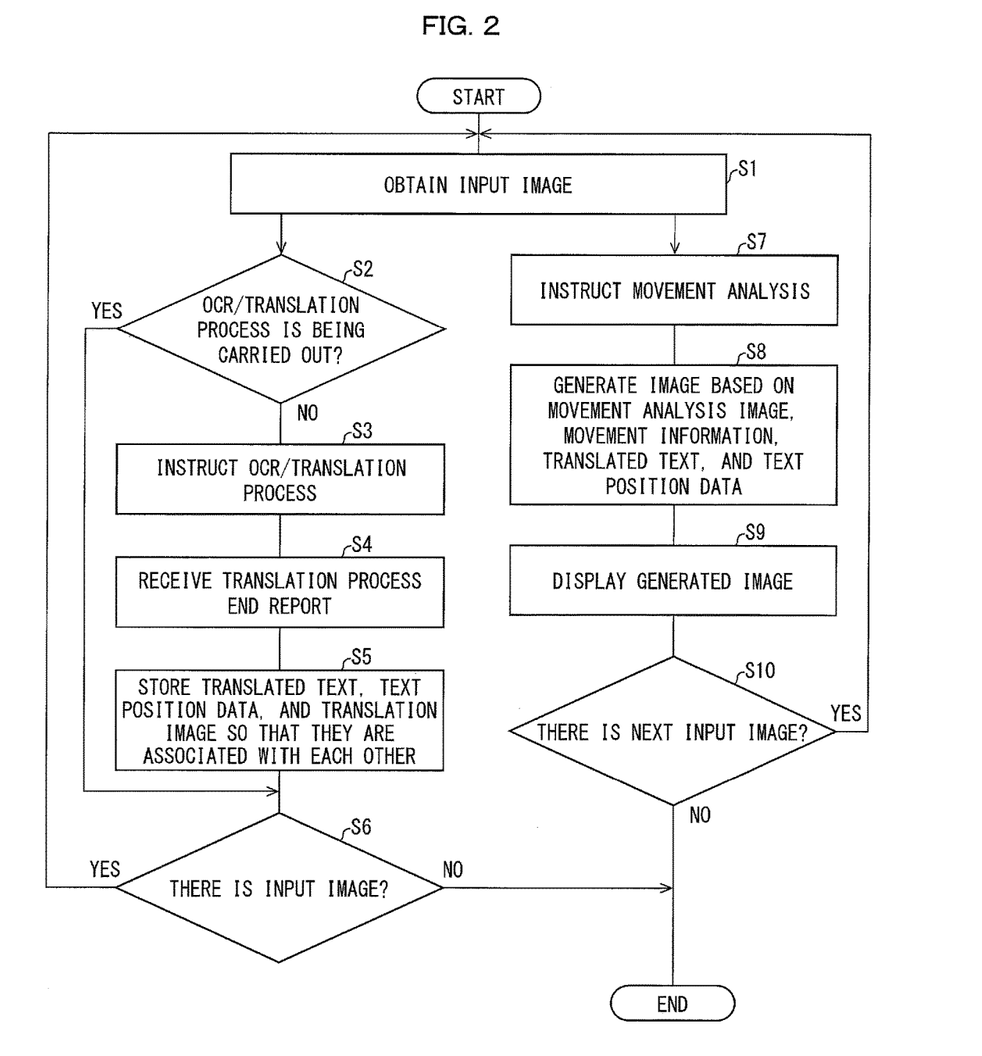
FIG. 2 is a flow chart showing an example of a flow of a process to be carried out by a control section of the translation display device.
Figure 3:
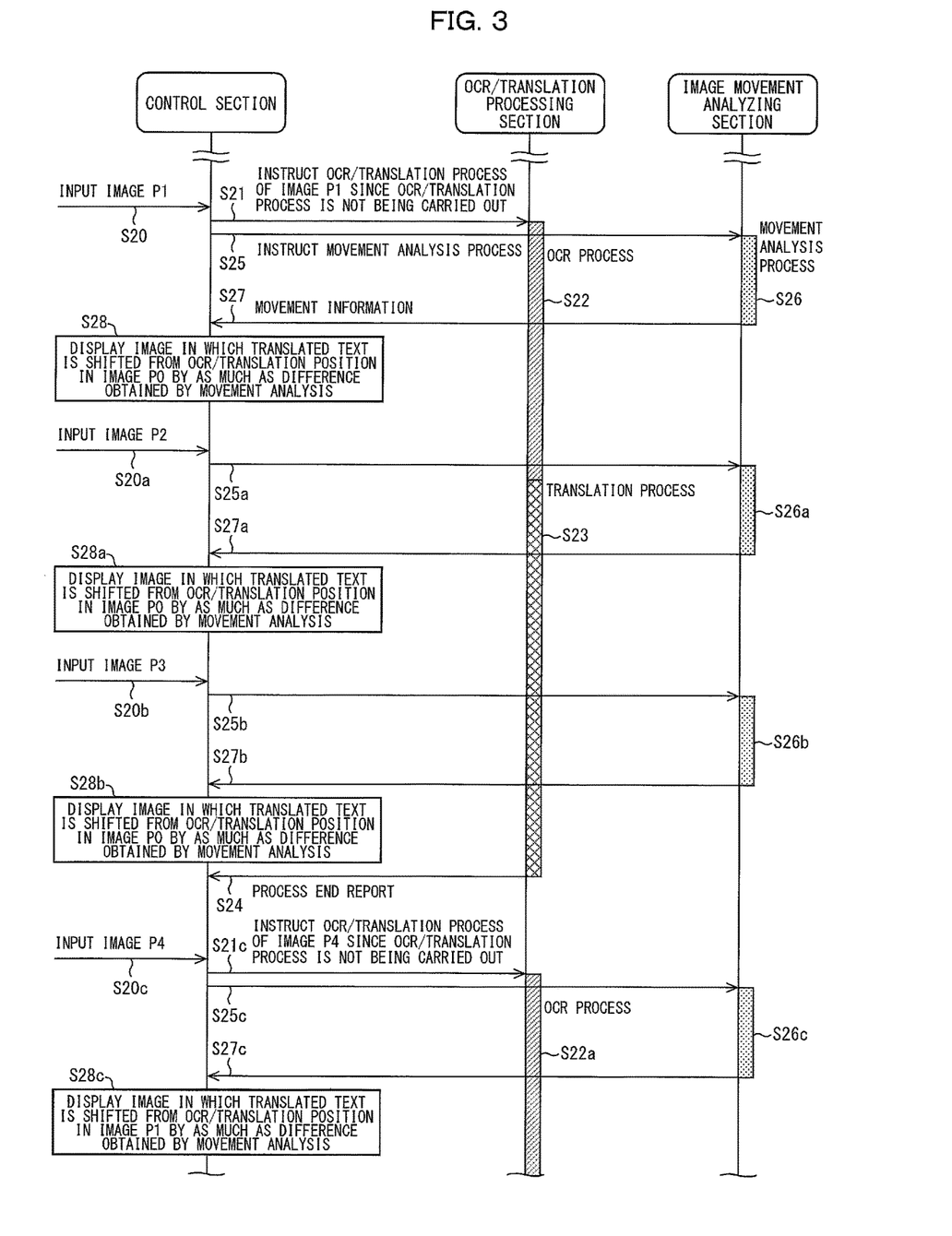
FIG. 3 is a sequence diagram showing an example of a flow of a translation display process.

The following description will discuss an embodiment of the present invention with reference to FIGS. 1 through 3.

FIG. 1 is a block diagram illustrating a main configurations of a translation display device 1. As illustrated in FIG. 1, the translation display device 1 includes a camera 2, a control section 3, an OCR processing section 4, a translation processing section (translating section) 5, a storage section 6, an image movement analyzing section (movement information identifying section) 7, and a display section 8. Examples of the translation display device 1 encompass a smartphone, a mobile phone, a digital camera, a digital video camera, a car navigation system, a personal computer (PC), and a personal digital assistant (PDA).

The camera 2 captures an image of an object such as text. For example, the camera 2 captures several to several tens of images per second and transmits the images thus captured to a camera image obtaining section (image obtaining section) 31.

The control section 3 (i) carries out various types of calculations by executing a program which has been supplied from the storage section 6 to a temporary storage section (not illustrated) and (ii) comprehensively controls sections included in the translation display device 1. According to Embodiment 1, the control section 3 includes, as function blocks, the camera image obtaining section 31, an OCR/translation instructing section 32, a movement analysis instructing section 33, and an image generating section 34.

The camera image obtaining section 31 sequentially obtains captured images captured by the camera 2 and then transmits the captured images to the OCR/translation instructing section 32 and the movement analysis instructing section 33.

The OCR/translation instructing section 32 receives a captured image from the camera image obtaining section 31 and then instructs the OCR processing section 4 and the translation processing section 5 to subject the captured image to an OCR process and a translation process, respectively. Specifically, the OCR/translation instructing section 32 first transmits, to the OCR processing section 4, the received captured image serving as an instruction to start an OCR process so that the received captured image is subjected to the OCR process. Note that the captured image that the OCR/translation instructing section 32 has transmitted to the OCR processing section 4 will be referred to as a translation image. Then, the OCR/translation instructing section 32 receives, from the translation processing section 5, translated text and text position data which serve as a process end report. The translated text is text which is obtained by translating text extracted from the translation image. The text position data is information indicative of a position of the text extracted from the translation image. In a case where the OCR/translation instructing section 32 has received the translated text and the text position data, the OCR/translation instructing section 32 controls the storage section 6 to store translation information in which the translation image, the translated text, and the text position data are associated with each other. In a case where the OCR/translation instructing section 32 has received the process end report, the OCR/translation instructing section 32 transmits, to the movement analysis instructing section 33, image identification information (an image ID or the like) indicative of the translation image which has been subjected to the OCR process and the translation process. Note that a plurality of pieces of translated text can be associated with a translation image. In such a case, a plurality of pieces of text position data corresponding to the respective plurality of pieces of translated text are associated with the translation image. As described later, the translation processing section 5 subjects, to a translation process, text which has been extracted by the OCR processing section 4. According to Embodiment 1, therefore, the OCR/translation instructing section 32 does not transmit a specific instruction to the translation processing section 5.

Note, however, that the OCR/translation instructing section 32 instructs the OCR processing section 4 and the translation processing section 5 to carry out respective processes in a case where the OCR processing section 4 or the translation processing section 5 is not subjecting, to a process, another image which differs from the captured image that the OCR/translation instructing section 32 has received. For example, during a period from a time point at which the OCR/translation instructing section 32 instructs the OCR processing section 4 to start an OCR process to a time point at which the OCR/translation instructing section 32 receives a process end report from the translation processing section 5, the OCR/translation instructing section 32 can judge that the OCR processing section 4 or the translation processing section 5 is carrying out a process. Note that in a case where the OCR/translation instructing section 32 receives a captured image from the camera image obtaining section 31 while the OCR processing section 4 or the translation processing section 5 is carrying out a process, the OCR/translation instructing section 32 does not instruct the OCR processing section 4 to subject the captured image thus received to an OCR process.

In a case where the movement analysis instructing section 33 has received a captured image from the camera image obtaining section 31, the movement analysis instructing section 33 instructs the image movement analyzing section 7 to analyze an image movement in the captured image thus received. Note that the captured image that the movement analysis instructing section 33 has instructed the image movement analyzing section 7 to analyze will be referred to as a movement analysis image. To describe the movement analysis instructing section 33 specifically, the movement analysis instructing section 33 identifies, as a reference image to be used for comparison with the movement analysis image, an image indicated by image identification information which has been received from the OCR/translation instructing section 32 most recently. The movement analysis instructing section 33 then instructs the image movement analyzing section 7 to analyze the movement analysis image with respect to the reference image. More specifically, the movement analysis instructing section 33 transmits, to the image movement analyzing section 7, (i) the captured image and (ii) the image identification information indicative of the reference image which have been received. The captured image and the image identification information thus transmitted serve as an instruction to analyze an image movement.

In a case where the image generating section 34 has received movement information and a movement analysis image from the image movement analyzing section 7, the image generating section 34 reads, from the storage section 6, translated text of and text position data of a reference image which has been compared with the movement analysis image thus received. In accordance with the text position data and the movement information, the image generating section 34 identifies a position (a translation display position) at which the translated text is to be displayed in the movement analysis image thus received. The image generating section 34 generates an image (a generated image) by superimposing the translated text on the translation display position of the movement analysis image. The image generating section 34 transmits the generated image to the display section 8 and controls the display section 8 to display the generated image.

The OCR processing section 4 receives a translation image from the OCR/translation instructing section 32, extracts text from the translation image, and then generates OCR text indicative of the text thus extracted. The OCR processing section 4 generates, as text position data, data indicative of a position from which the text has been extracted. The OCR processing section 4 transmits, to the translation processing section 5, the OCR text and the text position data which have been thus generated.

In a case where the translation processing section 5 has received OCR text and text position data from the OCR processing section 4, the translation processing section 5 carries out a translation process. Specifically, the translation processing section 5 translates the OCR text thus received into a language other than a language used in the OCR text. Alternatively, the OCR text can be translated into a plurality of languages. In a case where the translation processing section 5 has finished translating the OCR text, the translation processing section 5 transmits, to the OCR/translation instructing section 32, translated text and the text position data which serve as a process end report.

The storage section 6 stores a translation image, translated text, and text position data so that the translation image, the translated text, and the text position data are associated with each other.

In a case where the image movement analyzing section 7 has received, from the movement analysis instructing section 33, a movement analysis image and image identification information which serve as an instruction to analyze an image movement, the image movement analyzing section 7 reads, from the storage section 6, a translation image which is indicated by the image identification information and which serves as a reference image. The image movement analyzing section 7 analyzes a difference between the reference image and the movement analysis image so as to generate movement information. Then, the image movement analyzing section 7 transmits, to the image generating section 34, (i) the movement information thus generated and (ii) the movement analysis image which has been analyzed. Note that the movement information indicates a displacement of a position of an object in a movement analysis image from a position of an object in a reference image. For example, the movement information can be information (movement vector information) indicative of (i) a direction in which an object has moved and (ii) an amount by which the object has moved. In addition, the movement information can include information indicative of a difference in composition and zoom between the reference image and the movement analysis image.

The image movement analyzing section 7 can generate movement information by comparing an entire portion of the reference image with an entire portion of the movement analysis image. Alternatively, the image movement analyzing section 7 can generate movement information by comparing regions of the reference image with the corresponding regions of the movement analysis image. This makes it possible to generate, region by region, movement information indicative of a displacement of the movement analysis image. Since movement information is individually generated region by region, movements of objects belonging to respective regions of an image can be reflected in corresponding pieces of the movement information even in a case where, for example, the objects have moved in differing directions by differing amounts.

The display section 8 displays an image in accordance with an instruction provided by the control section 3. It is only necessary that the display section 8 display an image in accordance with an instruction provided by the control section 3. Examples of displays which can be applied to the display section encompass a liquid crystal display (LCD), an organic EL display, and a plasma display.

A flow of a process to be carried out by the control section 3 of the translation display device 1 in accordance with Embodiment 1 of the present invention will be described next. FIG. 2 is a flow chart showing an example of the flow of the process to be carried out by the control section 3 of the translation display device 1.

As illustrated in FIG. 2, the camera image obtaining section 31 obtains a captured image captured by the camera 2 and then transmits the captured image to the OCR/translation instructing section 32 and to the movement analysis instructing section 33 (step S1: image obtaining step). In a case where the OCR/translation instructing section 32 has received the captured image, the OCR/translation instructing section 32 judges whether or not the OCR processing section 4 or the translation processing section 5 is carrying out a process (step S2). In a case where the OCR/translation instructing section 32 has judged that the OCR processing section 4 or the translation processing section 5 is not carrying out a process (No in step S2), the OCR/translation instructing section 32 transmits, as a translation image to be translated, the received captured image to the OCR processing section 4 so as to instruct the OCR processing section 4 to subject the translation image to the OCR process (step S3). Then, the OCR/translation instructing section 32 receives, from the translation processing section 5, translated text and text position data which serve as a process end report (step S4). Then, the OCR/translation instructing section 32 controls the storage section 6 to store the text position data, the translated text, and the translation image so that the text position data, the translated text, and the translation image are associated with each other. The OCR/translation instructing section 32 also transmits, to the movement analysis instructing section 33, information indicative of the translation image thus stored (step S5). Then, the camera image obtaining section 31 judges whether or not there exists an input image (step S6). In a case where the camera image obtaining section 31 has judged that there exists no input image (No in step S6), the process carried out by the control section 3 ends. In a case where the camera image obtaining section 31 has judged that there exists an input image (Yes in step S6), the process carried out by the control section 3 proceeds to the step S1. Note that in a case where the OCR/translation instructing section 32 has judged that the OCR processing section 4 or the translation processing section 5 is carrying out a process on another image (in a case of Yes in the step S2), the process carried out by the control section 3 proceeds to the step S6.

In a case where the camera image obtaining section 31 has received a captured image (step S1), the control section 3 carries out steps S7 through 10 in parallel with the steps S2 through 6. The steps S7 through 10 will be described below. In a case where the movement analysis instructing section 33 has received a captured image from the camera image obtaining section 31, the movement analysis instructing section 33 instructs the image movement analyzing section 7 to analyze the captured image thus received (step S7). In a case where the image generating section 34 has received, from the image movement analyzing section 7, (i) a movement analysis image, of which the movement analysis instructing section 33 has instructed a movement analysis and (ii) movement information on the movement analysis image, the image generating section 34 reads, from the storage section 6, translated text of and text position data of a reference image. Then, in accordance with (i) a position indicated by the text position data and (ii) the movement information, the image generating section 34 identifies a display position at which the translated text is to be displayed in the movement analysis image. Then, the image generating section 34 generates a generated image in which the translated text is superimposed on the display position of the movement analysis image (step S8). The image generating section 34 transmits the generated image to the display section 8 and then controls the display section 8 to display the generated image (step S9: display step). Then, the camera image obtaining section 31 judges whether or not there exists an input image (step S10). In a case where the camera image obtaining section 31 has judged that there exists no input image (No in step S10), the process carried out by the control section 3 ends. In a case where the camera image obtaining section 31 has judged that there exists an input image (Yes in step S10), the process carried out by the control section 3 proceeds to the step S1.

A specific flow of a translation display process to be carried out by the translation display device 1 in accordance with Embodiment 1 of the present invention will be described next. FIG. 3 is a sequence diagram showing an example of the specific flow of the translation display process. In the example, it is assumed that (i) an image P0 was already subjected to an OCR/translation process before the translation display process illustrated in FIG. 3 is started, (ii) the image P0, translated text of the image P0, and text position data of the image P0 are stored in the storage section 6, and (iii) the image P0 is a reference image at a time point at which the translation display process starts.

As illustrated in FIG. 3, the control section 3 obtains an image P1 (step S20: an image obtaining step). Neither the OCR processing section 4 nor the translation processing section 5 is carrying out a process when the control section 3 obtains the image P1. Therefore, the control section 3 provides the OCR processing section 4 with an instruction to subject the image P1 to an OCR process (step S21). In response to the instruction from the control section 3, the OCR processing section 4 generates OCR text and text position data from the image P1, and then transmits the OCR text and the text position data to the translation processing section 5 (step S22). In a case where the translation processing section 5 has received the OCR text and the text position data, the translation processing section 5 subjects the OCR text to a translation process so as to generate translated text (step S23: a translation step). The translation processing section 5 then transmits, to the control section 3, the translated text and the text position data which serve as a process end report (step S24).

In the case where the image P1 has been supplied to the control section 3 (step S20), the control section 3 provides, in parallel with the step S21 being carried out, the image movement analyzing section 7 with an instruction to subject the image P1 to a movement analysis process by using the image P0 as a reference (step S25). In response to the instruction from the control section 3, the image movement analyzing section 7 identifies movement information which indicates a displacement of a position of an object in the image P1 with respect to a reference which is a position of an object in the image P0 (step S26: a movement information identifying step). The image movement analyzing section 7 then transmits, to the control section 3, the movement information thus generated and the image P1 (step S27). In a case where the control section 3 has received the image P1 and the movement information of the image P1 from the image movement analyzing section 7, the control section 3 reads, from the storage section 6, translated text of and text position data of the image P0 which, as a reference image, has been compared with the image P1. In accordance with (i) a position indicated by the text position data and (ii) the movement information, the control section 3 identifies a position at which translated text is to be displayed in the image P1. The control section 3 then (i) generates a generated image in which the translated text is superimposed on the position thus identified in the image P1 and (ii) controls the display section 8 to display the generated image (step S28: display step).

An image P2 is next supplied to the control section 3 so as to follow the image P1 (step S20a). Since the OCR processing section 4 is processing the image P1, the control section 3 does not instruct the OCR processing section 4 to subject the image P2 to an OCR process. Meanwhile, the control section 3 provides the image movement analyzing section 7 with an instruction to subject the image P2 to a movement analysis process (step S25a). The image P0 is an image which was most recently translated. Therefore, in response to the instruction from the control section 3, the image movement analyzing section 7 identifies movement information of the image P2 with respect to the image P0 serving as a reference (step S26a). The image movement analyzing section 7 then transmits, to the control section 3, the image P2 and the movement information of the image P2 (step S27a). In a case where the control section 3 has received the movement information and the image P2 from the image movement analyzing section 7, the control section 3 reads, from the storage section 6, translated text of and text position data of the reference image P0. The control section 3 generates a generated image in which translated text of the reference image P0 is superimposed on a translation display position of the image P2, which translation display position has been identified in accordance with (i) the text position data of the reference image P0 and (ii) the movement information on the image P2. The control section 3 then controls the display section 8 to display the generated image (step S28a).

An image P3 is next supplied to the control section 3 so as to follow the image P2 (step S20b). Since the translation processing section 5 is processing the image P1, the control section 3 does not provide the OCR processing section 4 with an instruction to subject the image P3 to an OCR process. Meanwhile, the control section 3 provides the image movement analyzing section 7 with an instruction to subject the image P3 to a movement analysis process (step S25b). In subsequent steps S26b, 27b, and 28b, the image P3 is processed as with the image P2 in the steps S26a, 27a, and 28a. Therefore, descriptions of the steps S26b, 27b, and 28b will be omitted.

An image P4 is next supplied to the control section 3 (step S20c). Note that before the control section 3 obtains the image P4, the control section 3 has received a translation process end report on the image P1. The control section 3 therefore (i) judges that neither the OCR processing section nor the translation processing section is carrying out a process and therefore (ii) provides the OCR processing section 4 with an instruction to subject the image P4 to an OCR process (step S21c). In response to the instruction from the control section 3, the OCR processing section 4 subjects the image P4 to a process similar to that carried out in the step S22 (step S22a).

In the case where the image P4 has been supplied to the control section 3 (step S20c), the control section 3 provides, in parallel with the step S21c being carried out, the image movement analyzing section 7 with an instruction subject the image P4 to a movement analysis process (step S25c). In so doing, since the image P1 is an image which was most recently translated, the control section 3 provides the image movement analyzing section 7 with an instruction to analyze an image movement in the image P4 by using the image P1 as a reference. In response to the instruction from the control section 3, the image movement analyzing section 7 generates movement information of the image P4 by using the reference image P1 as a reference (step S26c). The image movement analyzing section 7 transmits, to the control section 3, (i) the movement information thus generated and (ii) the image P4 (step S27c). In a case where the control section 3 has received the image P4 and the movement information of the image P4 from the image movement analyzing section 7, the control section 3 reads, from the storage section 6, translated text of and text position data of the reference image P1 which has been compared with the image P4. The control section 3 generates a generated image in which the translated text of the reference image P1 is superimposed on a translation display position of the image P4, which translation display position has been identified in accordance with (i) the text position data of the reference image P1 and (ii) the movement information on the image P4. The control section 3 then controls the display section 8 to display the generated image (step S28c).

As described above, the OCR/translation instructing section 32 controls the OCR processing section 4 and the translation processing section 5 to subject, to an OCR process and a translation process, respectively, an image that the camera image obtaining section 31 first obtained after an image is subjected to an OCR process and to a translation process. Therefore, even in a case where it takes time to carry out an OCR process and/or a translation process, it is still possible to output a latest translation result in accordance with the time it took to carry out the OCR process and/or the translation process. That is, it is possible to maintain, at a certain level or more, each of (i) accuracy of a position of text which has been extracted from an image and which is to be translated and (ii) accuracy of a translation of the text.

In accordance with (i) a position, in a reference image, from which text has been extracted and (ii) movement information which indicates a displacement of a position of text in a captured image with respect to the position of the text in the reference image, the image generating section 34 identifies a position, in the captured image, at which translated text of the reference image is to be displayed. Therefore, the translated text of the reference image can be displayed on the captured image so as to follow a proper position of the reference image without delaying a timing at which an image is to be displayed (i.e., without reducing a frame rate).

The translation display device 1 can therefore display, without delaying a timing at which an image is to be displayed (i.e., without reducing a frame rate), an image in which a certain level or more of accuracy is maintained in term of (i) a translation of text and (ii) a position at which translated text is to be displayed.

Embodiment 2

Figure 4:
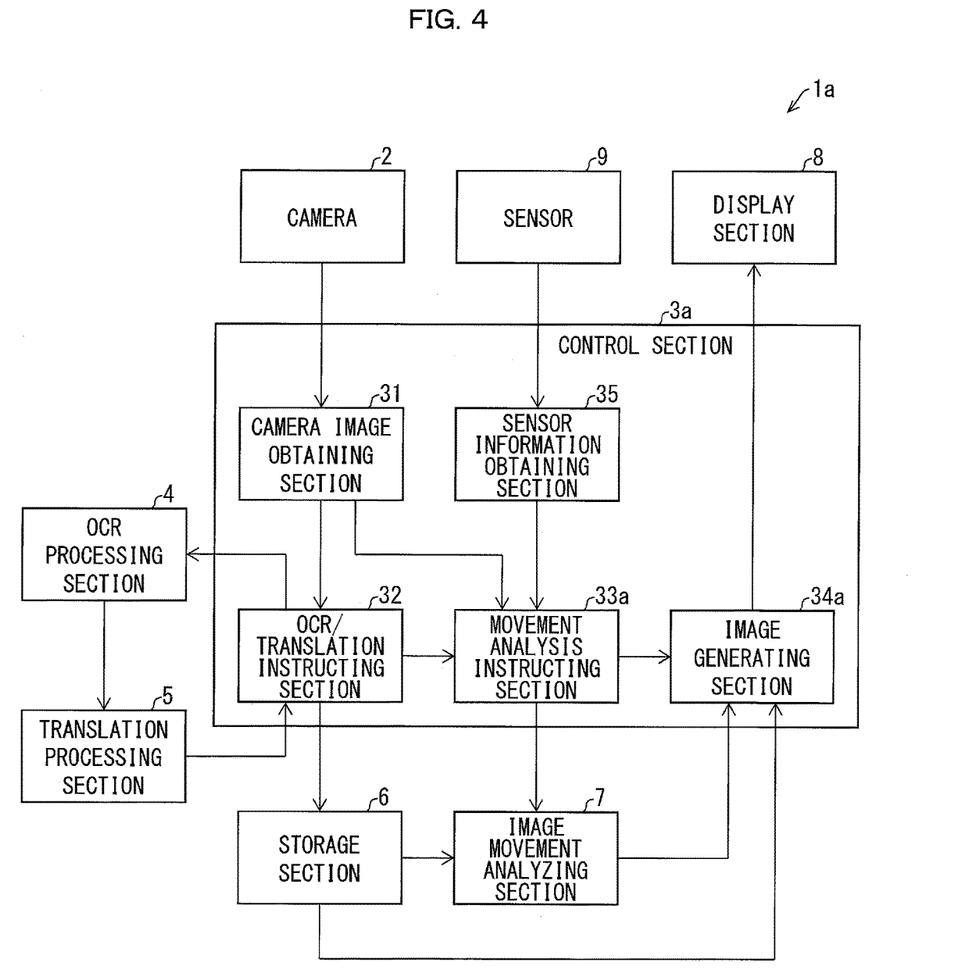
FIG. 4 is a block diagram illustrating main configurations of a translation display device in accordance with Embodiment 2 of the present invention.
Figure 5:
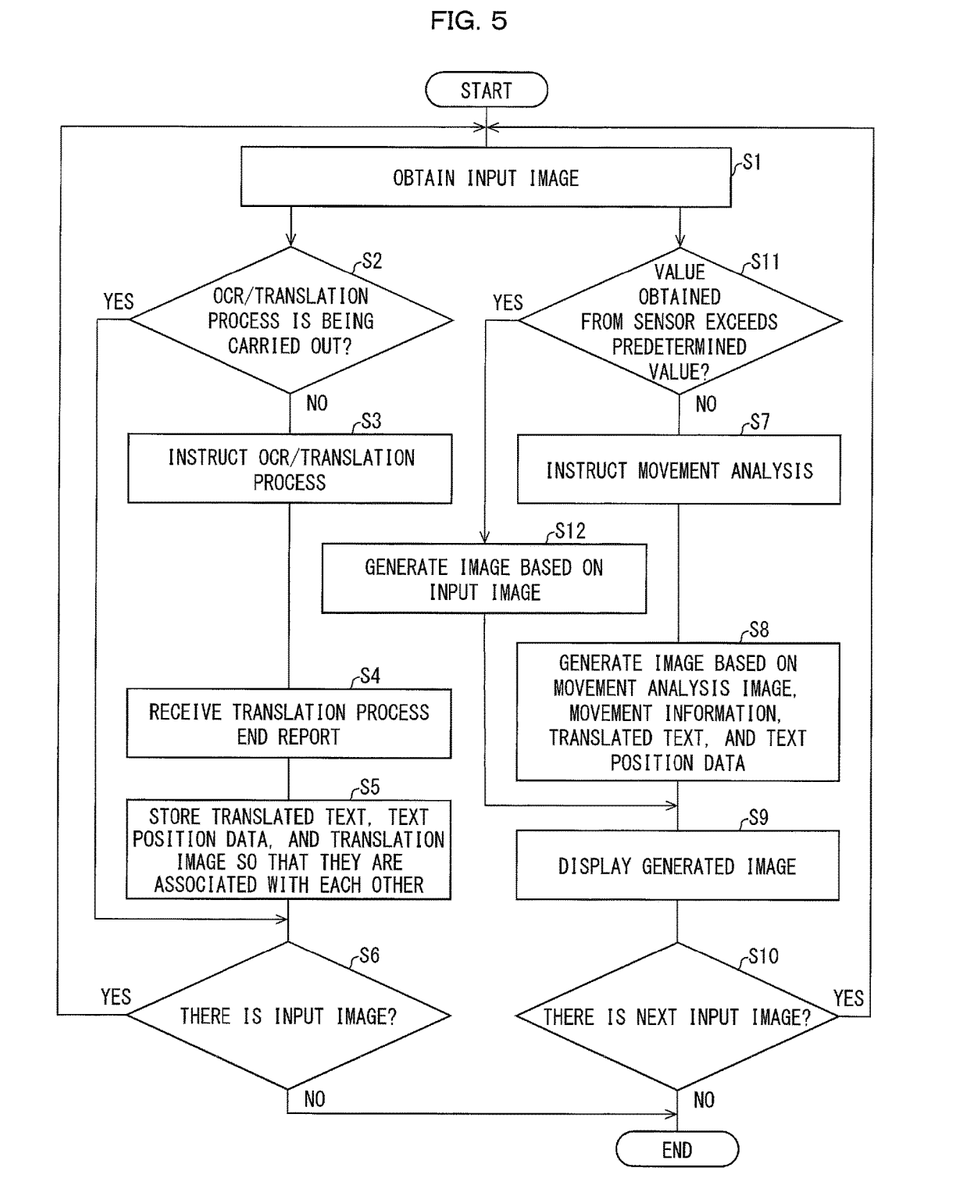
FIG. 5 is a flow chart showing an example of a flow of a process to be carried out by a control section of the translation display device.

The following description will discuss another embodiment of the present invention with reference to FIGS. 4 and 5. For convenience, members having functions identical to those of the members described in Embodiment 1 will be given the same reference signs, and descriptions of such members will be omitted. With reference to a function block diagram illustrated in FIG. 4, a configuration of a translation display device 1a in accordance with Embodiment 2 will be described below.

As illustrated in FIG. 4, the translation display device 1a includes a sensor (detection section) 9 in addition to the members included in the translation display device 1 of Embodiment 1. The translation display device 1a includes a control section 3a instead of including the control section 3.

The control section 3a includes a sensor information obtaining section 35 in addition to the members included in the control section 3. The control section 3a further includes a movement analysis instructing section 33a and an image generating section 34a instead of including the movement analysis instructing section 33 and the image generating section 34, respectively, of the control section 3 of Embodiment 1.

The sensor 9 detects a movement of a camera 2 (e.g., a direction of movement, an orientation, a rotation, a distance of movement, a speed of movement, etc.). The sensor 9 can be, for example, a six-axis sensor or the like. The sensor 9 transmits, to a sensor information obtaining section 35, a camera movement detection value indicating the movement of the camera 2.

In a case where the sensor information obtaining section 35 obtains the camera movement detection value from the sensor 9, the sensor information obtaining section 35 transmits the camera movement detection value to the movement analysis instructing section 33a.

In addition to the configuration of the movement analysis instructing section 33, the movement analysis instructing section 33a includes the following configuration. In a case where the movement analysis instructing section 33a receives a captured image from a camera image obtaining section 31, the movement analysis instructing section 33a makes a judgment regarding whether or not a value concerning the movement of the camera 2 has exceeded a predetermined range. Specifically, the movement analysis instructing section 33a makes the judgment in accordance with the camera movement detection value with respect to a reference state of the camera 2 at a time point at which a reference image was captured (a reference time point). For example, the above judgement can be made by referring to camera movement detection values obtained (i) at the reference time point and (ii) at a time point at which a captured image was captured. In a case where the movement analysis instructing section 33a has judged that the value concerning the movement of the camera 2 has exceeded the predetermined range, the movement analysis instructing section 33a does not instruct the image movement analyzing section 7 to carry out a movement analysis process and transmits, to the image generating section 34a, the captured image received from the camera image obtaining section 31.

Examples of the predetermined range with respect to the value concerning the movement of the camera 2 encompass (i) a predetermined range of angles within which the camera 2 rotates, (ii) a predetermined range of speeds within which the camera 2 moves, and (iii) a predetermined range of distances within which the camera 2 moves. More detailed examples of a case where the value concerning the movement of the camera 2 exceeds a predetermined range encompass (i) a case where an orientation of the camera has been rotated by 30 degrees or more from an orientation at the reference time point, (ii) a case where the camera has moved at a speed of 10 cm/second or more, and (iii) a case where the camera has moved by a predetermined distance or more from a position measured at the reference time point.

The image generating section 34a includes the configuration of the image generating section 34 described above. In a case where the image generating section 34a receives the captured image from the movement analysis instructing section 33a, the image generating section 34a transmits the captured image to a display section 8 and then controls the display section 8 to display the captured image while the captured image has not been subjected to any process after being obtained.

In a case where a value concerning the movement of the camera 2 exceeds the predetermined range at a time point at which a captured image is captured by the camera 2, text extracted from the reference image may not have been captured in the captured image. In such a case, it is unnecessary to follow a position of extracted text or to display translated text of the extracted text. According to the present invention, in a case where a value concerning a movement of the camera 2 exceeds a predetermined range, the image movement analyzing section 7 does not identify movement information, and the display section 8 displays an image obtained by the camera image obtaining section 31 while the image has not been subjected to any process after being obtained. This means that an unnecessary process is not carried out, and that it is therefore possible to reduce a processing load of the translation display device.

Note that in a case where (i) a value concerning a movement of the camera 2 once exceeds a predetermined range and (ii) the value concerning the movement of the camera 2 falls within the predetermined range at a time point at which a received captured image is captured, the movement analysis instructing section 33a judges that the value concerning the movement of the camera 2 has not exceeded the predetermined range. For example, in a case where the camera 2 rotates by 30 degrees or more from an orientation measured at a reference time point and then returns to the orientation, the movement analysis instructing section 33a judges that the value concerning the movement of the camera 2 falls within the predetermined range so that the movement analysis instructing section 33a instructs the image movement analyzing section 7 to carry out an image movement analysis. Therefore, in a case where text once falls outside a capturing range of the camera and then returns into the capturing range of the camera, it is possible to display translated text of text so that the translated text follows a position of the text.

A flow of a process to be carried out by the control section 3a of the translation display device 1a in accordance with Embodiment 2 of the present invention will be described next. FIG. 5 is a flow chart showing an example of the flow of the process to be carried out by the control section 3a. Part of the flow of the process, which part is similar to that of the process of the control section 3 in accordance with Embodiment 1, will not be described below.

Subsequently to the step S1, the movement analysis instructing section 33a receives a captured image from the camera image obtaining section 31. Then, the movement analysis instructing section 33a judges whether or not a value concerning a movement of the camera 2 from a reference time point at which a reference image stored in a storage section 6 had been captured to a time point at which the received captured image has been captured exceeds a predetermined range (step S11). In a case where the movement analysis instructing section 33a has judged that the value concerning the movement of the camera 2 exceeds the predetermined range (Yes in step S11), the movement analysis instructing section 33a transmits, to the image generating section 34a, the captured image received from the camera image obtaining section 31 (step S12). A step S9 subsequent to the step S12 is carried out in the following manner. The image generating section 34a treats, as a generated image without any processing, the captured image received from the movement analysis instructing section 33a. The image generating section 34a transmits the generated image to the display section 8 and then controls the display section 8 to display the generated image (step S9). The process carried out by the control section 3a then proceeds to a step S10.

That is, according to the translation display device 1a, the camera image obtaining section 31 obtains an image captured by the camera 2, and the translation display device 1a further includes the sensor 9 for detecting a movement of the camera 2. In a case where a value concerning the movement of the camera 2 with respect to a state of the camera at a time point at which the reference image was captured exceeds the predetermined range, the image movement analyzing section 7 does not identify movement information. The display section 8 displays the image obtained by the camera image obtaining section 31 while the image has not been subjected to any process after being obtained.

In a case where the value concerning the movement of the camera 2 exceeds a predetermined range, text extracted from a reference image may not be captured in an image that the camera image obtaining section 31 has most recently obtained. In such a case, it is unnecessary to follow a position of extracted text or to display translated text of the extracted text.

According to the configuration, in a case where the value concerning the movement of the camera 2 exceeds the predetermined range, the image movement analyzing section 7 does not identify movement information, and the display section 8 displays an image obtained by the camera image obtaining section 31 while the image has not been subjected to any process after being obtained. This means that an unnecessary process is not carried out, and it is therefore possible to reduce a processing load of the translation display device.

According to the configuration, in a case where the value concerning the movement of the camera 2 exceeds the predetermined range at a current time point (a time point at which an image most recently obtained by the camera image obtaining section 31 was captured), no unnecessary process is carried out. Therefore, in a case where (i) the value concerning the movement of the camera 2 has once exceeded the predetermined range and (ii) the value concerning the movement of the camera 2 at a current time point falls within the predetermined range, the image movement analyzing section 7 identifies movement information and the display section 8 displays translated text so that the translated text is superimposed on the image that has been most recently obtained. Therefore, in a case where text once falls outside a capturing range of the camera and then the text returns into the capturing range of the camera, it is possible to display translated text of text so that the translated text follows a position of the text.

Embodiment 3

The control section 3, the OCR processing section 4, the translation processing section 5, and the image movement analyzing section 7 of the translation display device 1 and the control section 3a, the OCR processing section 4, the translation processing section 5, and the image movement analyzing section 7 of the translation display device 1a can be realized by a logic circuit (hardware) provided in an integrated circuit (IC chip) or the like or can be alternatively realized by software as executed by a central processing unit (CPU).

In the latter case, the translation display devices 1 and 1a each include a CPU that executes instructions of a program that is software realizing the foregoing functions; a read only memory (ROM) or a storage device (each referred to as "storage medium") in which the program and various kinds of data are stored so as to be readable by a computer (or a CPU); and a random access memory (RAM) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be supplied to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

SUMMARY

A translation display device (1, 1a) in accordance with a first aspect of the present invention is a translation display device including: an image obtaining section (image obtaining section 31) for sequentially obtaining images; a translating section (translation processing section 5) for a carrying out a translation process of translating text extracted from any given image, the translating section subjecting a certain image to the translation process in a case where the image obtaining section obtains the certain image while no image other than the certain image is being subjected to the translation process; a movement information identifying section (image movement analyzing section 7) for identifying movement information indicative of a displacement of a position of an object in a most recent image which has been most recently obtained by the image obtaining section, the displacement being measured with respect to a reference position of an object in a reference image for which the translation process most recently ended; and a display section (display section 8) for displaying a generated image in which translated text obtained by translating extracted text extracted from the reference image is superimposed on the most recent image in accordance with (i) a position of the extracted text and (ii) the movement information.

According to the configuration, the translating section carries out a translation process of translating text extracted from a certain image obtained by the image obtaining section, in a case where no image other than the certain image is being subjected to the translation process, whereas no translation process is carried out with respect to a certain image obtained by the image obtaining section, in a case where another image other than the certain image is being subjected to the translation process. In other words, the translating section subjects, to a translation process, an image that the image obtaining section first obtained after an image is subjected to a translation process. Therefore, even in a case where it takes time to carry out a translation process, it is still possible for the translating section to output a latest translation result in accordance with the time it took to carry out the translation process. That is, it is possible to maintain, at a certain level or more, each of (i) accuracy of a position of text which has been extracted from an image and which is to be translated and (ii) accuracy of a translation of the text.

The display section displays a generated image in which translated text obtained by translating extracted text extracted from the reference image is superimposed on the most recent image in accordance with (i) a position of the extracted text and (ii) the movement information. That is, the display section displays, in accordance with a translation result which has been obtained in the past, translated text of text so that the translated text follows a position of the text. This allows the display section to display translated text so that the translated text is superimposed on an image at a timing at which the image obtaining section obtains the image. The display section displays the translated text in accordance with a latest translation result and, as described above, it is therefore possible to display the translated text while maintaining, at a certain level or more, each of (i) accuracy of a translation of the translated text and (ii) accuracy of a position at which the translated text is to be displayed.

The translation display device brings about an effect of displaying, without delaying a timing at which an image is to be displayed (i.e., without reducing a frame rate), an image in which (i) translation of text and (ii) a position at which translated text is to be displayed maintain accuracy at a certain level or more.

In a second aspect of the present invention, a translation display device (1a) can further include, in the first aspect of the present invention, a detection section (sensor 9) for detecting a movement of a camera (2), the image obtaining section obtaining an image captured by the camera, in a case where a value concerning the movement of the camera with respect to a reference state of the camera at a time point at which the reference image was captured by the camera exceeds a predetermined range, (i) the movement information identifying section not identifying movement information and (ii) the display section displaying an image obtained by the image obtaining section while the image has not been subjected to any process after being obtained.

In a case where a value concerning a movement of the camera exceeds a predetermined range, text extracted from the reference image may not have been captured in an image which has been most recently obtained by the image obtaining section. In such a case, it is unnecessary to follow a position of extracted text or to display translated text of the text.

According to the configuration, in a case where the value concerning the movement of the camera exceeds the predetermined range, the movement information identifying section does not identify movement information, and the display section displays an image obtained by the image obtaining section while the image has not been subjected to any process after being obtained. This means that an unnecessary process is not carried out, and it is therefore possible to reduce a processing load of the translation display device.

According to the configuration, in a case where the value concerning the movement of the camera exceeds the predetermined range at a current time point (a time point at which an image most recently obtained by the image obtaining section was captured), no unnecessary process is carried out. Therefore, in a case where (i) the value concerning the movement of the camera has once exceeded the predetermined range and (ii) the value concerning the movement of the camera at a current time point falls within the predetermined range, the movement information identifying section identifies movement information and the display section displays translated text so that the translated text is superimposed on the image that has been most recently obtained. Therefore, in a case where text once falls outside a capturing range of the camera and then the text returns into the capturing range of the camera, it is possible to display translated text of text so that the translated text follows a position of the text.

In a third aspect of the present invention, a translation display device (1a) can be arranged such that, in the second aspect of the present invention, the value concerning the movement of the camera with respect to the reference state of the camera at the time point at which the reference image was captured is any one of (i) an angle by which the camera has rotated, (ii) a speed at which the camera has moved, and (iii) a distance by which the camera has moved.

A method of displaying a translation in accordance with a fourth aspect of the present invention is a method of displaying a translation, including the steps of: (a) sequentially obtaining images; (b) carrying out a translation process of translating text extracted from any given image, the step (b) being carried out so that a certain image is subjected to the translation process in a case where the certain image is obtained while no image other than the certain image is being subjected to the translation process; (c) identifying movement information indicative of a displacement of a position of an object in a most recent image which has been most recently obtained in the step (a), the displacement being measured with respect to a reference position of an object in a reference image for which the translation process most recently ended in the step (b); and (d) displaying a generated image in which translated text obtained by translating extracted text extracted from the reference image is superimposed on the most recent image in accordance with (i) a position of the extracted text and (ii) the movement information. The method brings about an effect similar to that of the first aspect.

The translation display device in accordance with the aspects of the present invention can be realized by a computer. In such a case, the scope of the present invention also encompasses (i) a control program for the translation display device which program controls the translation display device to be realized by the computer through controlling the computer to serve as each of the members included in the translation display device and (ii) a computer-readable storage medium in which the program is stored.

The present invention is not limited to the embodiments, but can be altered by a skilled person in the art within the scope of the claims. An embodiment derived from a proper combination of technical means each disclosed in a different embodiment is also encompassed in the technical scope of the present invention. Further, it is possible to form a new technical feature by combining the technical means disclosed in the respective embodiments.

INDUSTRIAL APPLICABILITY

The present invention is applicable to a smartphone, a mobile phone, a digital camera, a digital video camera, a car navigation system, a PC, a PDA, or the like.

REFERENCE SIGNS LIST 1, 1a: Translation display device
2 Camera;
5: Translation processing section (translating section)
7 Image movement analyzing section (movement information identifying section)
8 Display section
9 Sensor (detection section)
31 Camera image obtaining section (image obtaining section)
P0, P1 Reference image
P1, P2, P3, P4 Image
S1, S20 Image obtaining step
S23 Translation step
S26 Movement information identifying step
S9 Display step

The invention claimed is:

1. A translation display device comprising:
a processor and an associated memory; wherein
the processor:
sequentially obtains images;
performs a translation process of translating text extracted from any given image, and subjects a certain image to the translation process in a case where the certain image is obtained while no image other than the certain image is being subjected to the translation process; and
identifies movement information indicative of a displacement of a position of an object in a most recent image which has been most recently obtained, the displacement being measured with respect to a reference position of an object in a reference image for which the translation process most recently ended; and
the translation display device further includes a display that displays a generated image in which translated text obtained by translating extracted text extracted from the reference image is superimposed on the most recent image in accordance with (i) a position of the extracted text and (ii) the movement information, and a sensor that detects a movement of a camera, wherein
the processor obtains an image captured by the camera, and
in a case where a value concerning the movement of the camera with respect to a reference state of the camera at a time point at which the reference image was captured by the camera exceeds a predetermined range, (i) the processor does not identify movement information and (ii) the display displays the image obtained by the processor while the image has not been subjected to any process after being obtained.

2. The translation display device as set forth in claim 1, wherein the value concerning the movement of the camera with respect to the reference state of the camera at the time point at which the reference image was captured is any one of (i) an angle by which the camera has rotated, (ii) a speed at which the camera has moved, and (iii) a distance by which the camera has moved.

3. A method of displaying a translation, comprising the steps of:

(a) sequentially obtaining images;
(b) carrying out a translation process of translating text extracted from any given image, the step (b) being carried out so that a certain image is subjected to the translation process in a case where the certain image is obtained while no image other than the certain image is being subjected to the translation process;
(c) identifying movement information indicative of a displacement of a position of an object in a most recent image which has been most recently obtained in the step (a), the displacement being measured with respect to a reference position of an object in a reference image for which the translation process most recently ended in the step (b);
(d) displaying a generated image in which translated text obtained by translating extracted text extracted from the reference image is superimposed on the most recent image in accordance with (i) a position of the extracted text and (ii) the movement information;
(e) obtaining a movement of a camera detected by a sensor; and
(f) obtaining an image captured by the camera, wherein
in a case that a value concerning the movement of the camera with respect to a reference state of the camera at a time point at which the reference image was captured by the camera exceeds a predetermined range, (i) not identifying any movement information and (ii) displaying the image obtained in the step (f) while the image has not been subjected to any process after being obtained.

* * * * *